Feb. 28, 1956

C. T. BLUME 2,736,101

TRAMMING TOOL

Filed July 3, 1950

Inventor
Carl T. Blume

By Ezekiel Wolf
his Attorney.

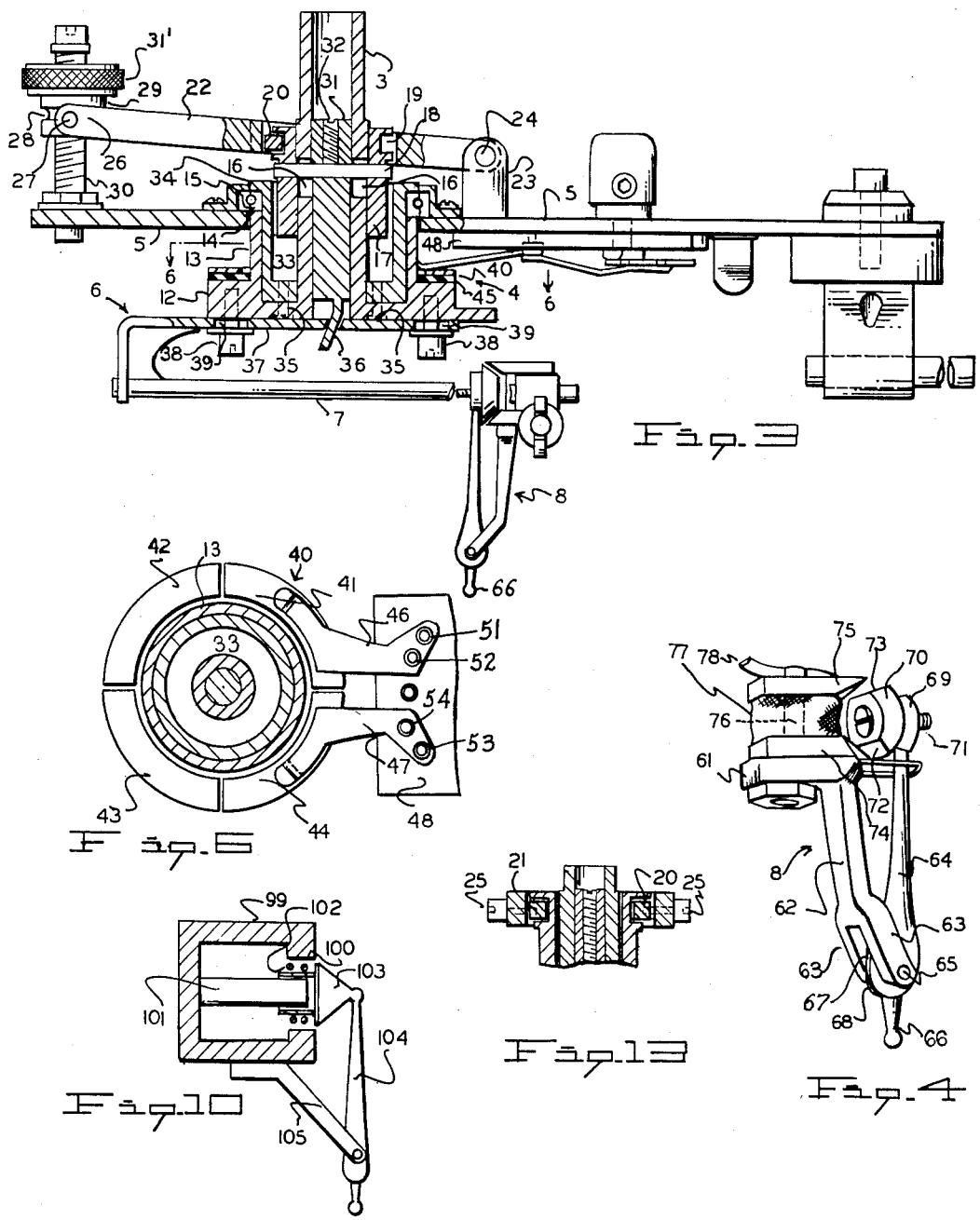

Feb. 28, 1956 C. T. BLUME 2,736,101
TRAMMING TOOL
Filed July 3, 1950 3 Sheets-Sheet 3
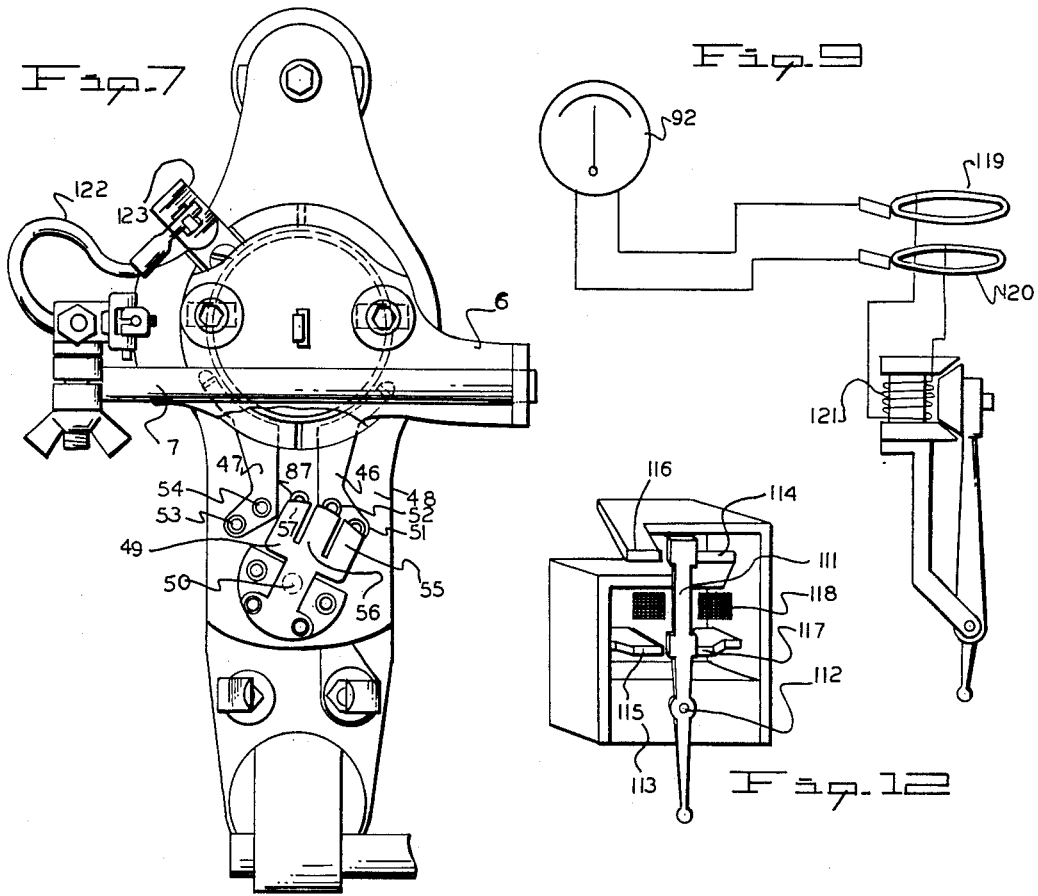
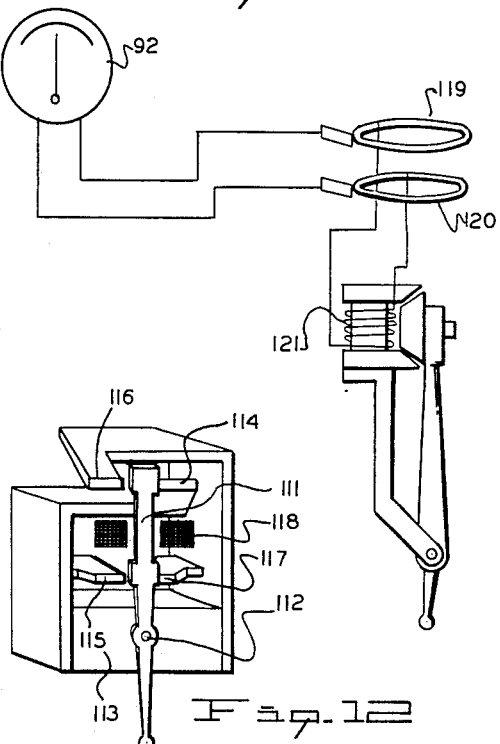
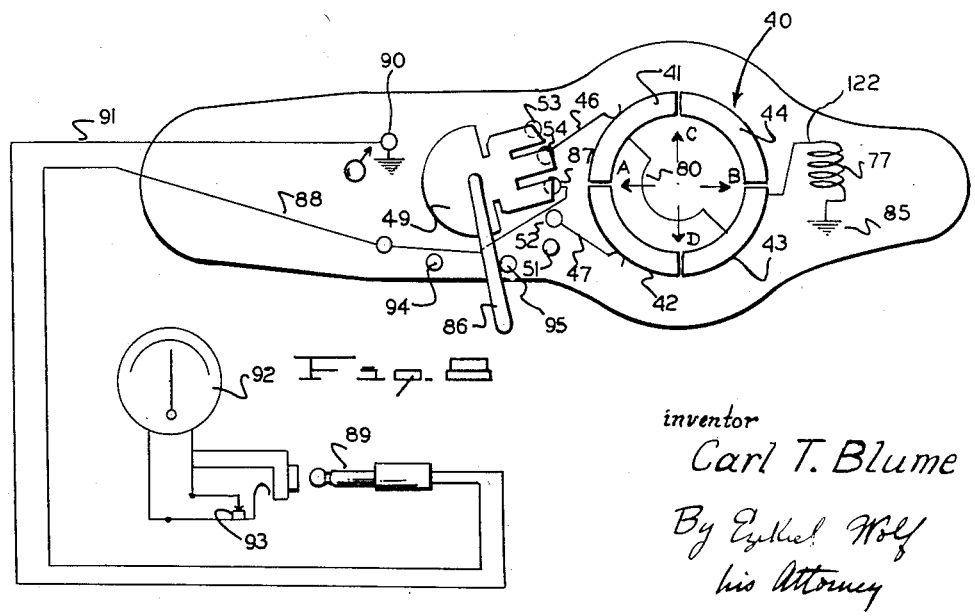
inventor
Carl T. Blume
By Ezekiel Wolf
his Attorney

United States Patent Office 2,736,101
Patented Feb. 28, 1956

2,736,101

TRAMMING TOOL

Carl T. Blume, West Newton, Mass.

Application July 3, 1950, Serial No. 171,977

8 Claims. (Cl. 33—172)

The present invention relates to a tramming indicator used for centering a work piece with the spindle of a jig borer, boring mill, milling machine and any other type of machine where the work to be operated on must be aligned for proper and symmetrical machining, turning, or the like.

The device of the present invention has other uses as for instance in shaft alignment and other alignments of working parts of machinery or of pieces to be worked.

A feature of the present invention is that the indication is provided through electrical means and that the indicator may be used to indicate disalignments along two or more axes as well as perfect alignment when the indicator remains in balance. The specific methods of providing an electrical indication may be accomplished through various electrical means which may include electromagnetic, electrodynamic, electrostatic, translating devices, or microphonic elements for converting mechanical motion to electrical indications. Basicaly, such devices should be operable without any means of amplification in order to provide the simplest and most inexpensive design and construction.

In the methods now generally in use, a dial test indicator is fastened to the spindle of a machine tool with a probe or finger of the indicator touching the inside or the outside of a round portion of the work which is being centered. The spindle is then turned by hand and corrections are made on the longitudinal and cross feeds of the machine until a zero reading of the indicator is had at all positions. The indicator in this case turns with the spindle so that it must be looked at from all angles and this is not only a slow process but leads to inaccuracies unless the operator is very patient and careful.

In the device according to the present invention, the indicator which is observed remains in a fixed position while the probe and the mechanism by which it is suspended or supported is attached to the spindle of the machine with the probe making contact with the work piece which is to be set up in the proper work position. The spindle is made to rotate under power and the movement of the probe back and forth due to the work not being in alignment with the spindle will generate or cause current to be produced or might cause a current to be varied which will operate a fixed indicator or measuring instrument to provide an indication of the alignment of the work. The probe is supported in such a way that it may be adjusted with reference to the axis of rotation of the spindle in the initial set up of the instrument with reference to the work piece and also so that a further adjustment may be had while the machine is in motion.

A further advantage in the present instrument is that the operator can tell which of the table adjustments is out of alignment by making individual observations for each, and adjustments therefore may be quickly made in the proper direction for obtaining a perfect centering of the work piece. The time which it takes to make these adjustments is only a fraction of the time needed when a mechanical indicator is employed, and the accuracy of the present device is easily obtained to .0001 of an inch. The device as described is self-powered and requires no external connection.

Other features and advantages of the present invention will be more readily appreciated and understood from the description of the invention as set forth in the specification below when taken in connection with the drawings as showing embodiments thereof in which:

Figure 3 is a section taken substantially along the line 3—3 of Figure 2.

Figure 4 is a perspective view of the probe and electrical translating device shown in Figures 1 and 3.

Figure 6 is a section taken on the line 6—6 of Figure 3.

Figure 7 is a plan view partly in fragmentary section looking upward at the device as shown in Figure 3 but in a different position.

Figure 8 is a diagrammatic view illustrating the wiring of the device.

Figure 9 is a simplified, modified, diagrammatic view of the wiring of the device.

Figures 10, 11 and 12 show modifications of the detail of the translating device corresponding to the arrangement shown in Figure 4; and Figure 13 shows a small sectional view on the line 13—13 of Figure 1.

Figure 1:
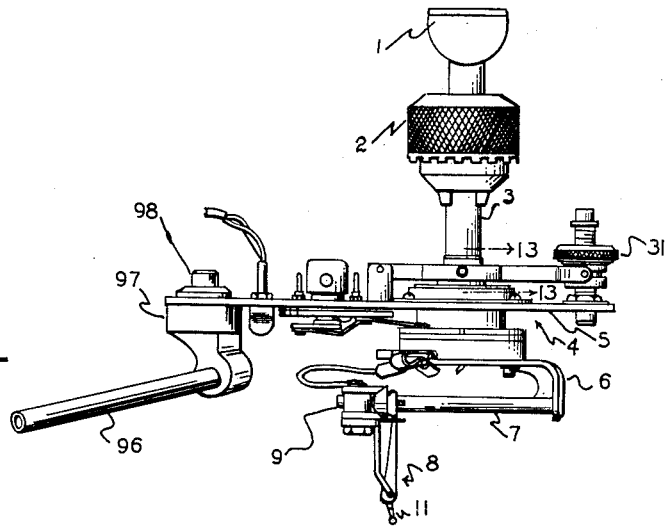
Figure 1 shows the device as attached to a jig borer or similar machine.
Figure 2:
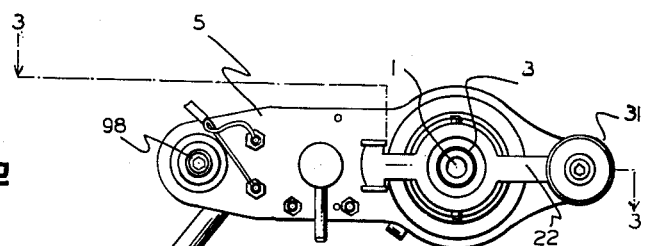
Figure 2 is a plan view of Figure 1 as viewed from the top.

In the drawings referring to Figure 1, the device may be mounted in the spindle 1 of a jig borer, lathe, or any other suitable machine. The device has a sleeve 3 which fits into a collet or chuck 2 which turns with the spindle 1. The rotating mechanism of the instrument turns with the chuck or collet 2 and this comprises the entire hub 4 supported for rotation on a plate 5. This hub includes a tramming arm or bracket 6 carrying a horizontally positioned bar or rod 7 on which the probe assembly 8 which carries the translating device 9 may be adjusted in a horizontal position. The probe assembly 8 may be positioned along the bar 7 in any desired position, this providing a rough adjustment. The fine adjustment of position of the probe assembly may be obtained while the machine is in motion through the turning of the knurled head 31 which controls the mechanism which will be described later in the specification. The probe 11 is brought up against the work to be aligned and then is rotated around the work to provide the necessary indications. It is assumed that the jig borer or other tool in which the work is held will have longitudinal and cross feed adjustments so that the work may be moved in a horizontal direction in the plane of the paper as for instance as viewed in Figure 1 and perpendicular to this plane, one direction of which may be called the longitudinal adjustment while the other direction is usually called the cross adjustment.

Referring more particularly to Figure 3, the sleeve or shank 3 is an integral part of the hub and is provided with an external annular flange 12 from which there extends upwardly a collar 13 which has a small shoulder 14 serving as the lower bearing surface for the ball bearing ring 15 within which the sleeve turns. The sleeve 3 is provided with a pair of aligned slots 16 and surrounding this section of sleeve is an outer sleeve or cylinder 17 through which the pin 18 passes, which pin extends through the slots 16. The cylinder 17 has a collar groove 19 near its top end and in this groove rides a yoke 20 which is attached to the ring 21 (see Figure 13) which is integral with a pivoted arm 22 (Figure 3) supported by a horizontal pivot 24 through a post 23 mounted on the plate 5. The yoke 20 is held to the ring section 21 of the arm 22 by means of the machine screws 25 (Figure 13) which pass through the ring 21 and form pivots for the yoke. The arm 22 has a forked end 26 with inwardly extending pins 27 which extend into a groove 28 in the collar 29 which is threaded so that it may be turned and moved up and down the threaded stud 30 which is fixed in the plate 5. The collar 29 is provided with a knurled head 31' so that it may be turned by hand on the stud 30. Turning the collar 29 will move it up and down the cylinder 17 surrounding the sleeve 3 and also the shaft 31 which fits within the sleeve 3 since the pin 18 passes through this shaft. The pin 18 is pinned to the shaft or solid cylinder 31 by means of a set screw 32. As a result of this, the cylinder 17 will travel up and down the length of the slots 16 and for this purpose sufficient space must be provided below the cylinder 17 for its movement in the well 33.

As has previously been stated, the sleeve 3 which is a part of the whole hub 4 rotates freely in the plate 5. The ballbearing race 15 which is held in place by means of the extending shoulder 14 on the lower side is supported or clamped in position on its upper side by the shoulder 34 which fits to the inside of the collar or sleeve section 13 and is fixed to the lower flange 12 by means of the screws 35, 35. The solid shaft or cylinder 31 has at its lower end an angular tongue 36 which of course has the same travel as the cylinder 17 by means of the adjustment of the knurled head 31. This tongue 36 is positioned in the diametric center of the rotating hub and passes through the plate 37 which is a part of the bracket 6 to which the rod or shaft 7 carrying the probe assembly 8 is attached. The plate 37 is mounted on the face of the flange 12 by means of the screws 38. These, however, pass through diametric slots 39 in the plate section 37 of the bracket so that as the tongue 36 is moved up and down, the whole probe assembly will be moved in a horizontal direction coinciding with the cross adjustment axis of the hub which in effect provides a fine control for the movement of the probe assembly. The purpose of this mechanis is not so much to provide a fine adjustment as it is to provide a means of adjustment while the machine is in motion.

Mounted on the upper face of the flange 12 is a commutator 40 (see Figure 6) which is provided with four segments 41, 42, 43 and 44, which commutator is insulated by means of an insulating disk 45. A couple of contact brushes 46 and 47 are positioned to contact adjacent commutator segments. The other ends of these contacts are fixed on an insulated plate 48 on which is mounted a multiple contact switch 49 (see Figures 7 and 8) which may be turned about a pivot 50 between stops 94 and 95. The contact brushes 46 and 47 have each two contacts, 51 and 52 for the brush 46 and 53 and 54 for the brush 47, while the multiple switch 49 is provided with three contact arms 55, 56, and 57 which in various positions contact the studs 51 and 52 in the position of the switch 49 at the right as shown in Figure 7, 53 and 54 in a position of the switch at the left, or 54 and 52 in a central position, wherein the brushes 46 and 47 are connected together. In all of these positions connection is made to contact 87. In the position of the switch 49 to the right, an indication will be obtained of alignment upon one feed axis of the machine in which the work is set up, and in the position of the switch to the left, indication of alignment will be obtained on the feed axis at right angles to the first axis, while in the middle position of the switch 49 both indications will be observed and a zero centering may thereby be effected. It should be noted that the brushes 46 and 47 bear against the commutator only at radii 90° from each other.

The probe assembly 8 is shown in Figures 1, 3, 4 and 5, and also in the simplified circuit diagram of Figure 9. The assembly is supported by means of a clamping collar 58, Figure 5, which clamps the assembly to the rod 7.

Figure 5:
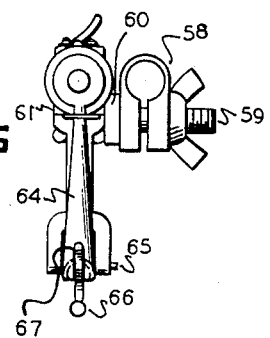
Figure 5 is a detail view of the device shown in Figure 4.

This clamping collar is carried by a threaded stud 59 which extends from a plate 60, Figure 5, which may be welded or attached to a bracket 61 which has a downwardly extending forked arm 62 (see Figure 4) between the tynes 63 in which the probe shaft 64 is pivoted by a pivoting pin 65. The probe pointer 66 is pivoted about the pin 65 in a slot 67 (Figure 5) in the end of the probe arm 64 and the probe point or pin 66 is made to have a friction fit by means of shims as indicated by 68 (see Figure 4). At the top of the probe arm there is carried a rounded disk 69 threaded at the center to hold the permanent magnet piece 70 by means of a bolt 71 which threads through the disk 69. The permanent magnet 70 may be of "alnico" or "hyperloy" or some other alloyed magnetic material commonly used in the art providing a permanent magnet of substantial magnetic strength. The magnetic element 70 may be tapered on its top and bottom surfaces which will comprise north and south poles as indicated at 73 and 72 which are opposite to the poles 75 and 74 respectively which extend from the end of a core 76 about which a coil 77 is wound. The coil may be grounded on one side and at the other side is provided with a lead 78 which connects into the electrical circuit which will presently be described. As the probe point 66 comes in contact with the work piece, the arm 64 and the permanent magnet armature 70 are pulled away from the stationary poles 74 and 75 which increases the reluctance of the magnetic circuit formed by the core 76, the pole pieces 74 and 75, and the permanent magnet armature 70 with its poles 73 and 72. This will vary the magnetic lines of force cutting the coil 77 and will induce a current in it which may be noted on a suitable indicator. Instead of having 70 as the permanent magnet armature, it may act simply as an armature and the permanent magnet may comprise the pole pieces 74 and 75 with the core 76.

The circuit arrangement will be more readily seen in Figures 8 and 9. The commutator which is shown in Figures 6, 7, and 8 has four segments 41, 42, 43 and 44 previously mentioned, each of which is shown as extending over a 90° arc. The segments 41 and 43 are connected together by a conductor 80 while the segments 42 and 44 which are diammetrically opposite are not connected. The coil 77 is grounded on one side as indicated at 85 and on the other side is connected permanently to the commutator segment 43. This permanent connection is possible since the coil rotates with the commutator and therefore maintains always the same relative position to it. The brushes 46 and 47 are connected respectively in the positions as shown in Figures 3, 7 and 8 which at the instant represented bear upon the commutator segments 41 and 42. Since, however, the commutator rotates and the brushes 46 and 47 are stationary, the brushes 46 and 47 will bear successively on the different commutator segments as it is rotated. The switch 49 which is operated by means of the handle 86 may occupy three positions as previously disclosed. In the circuit as seen in Figure 8, the switch 49 is connected with a brush 46 and connected through the central stud 87 to one of the conductors 88 which leads to the meter jack 89. The other connection is to ground as indicated at 90. This arrangement, it is seen, places the coil 77 in series with the conductors 88 and 91 at instrument jack 89. The instrument 92 which may be a zero centre scale volt meter may be directly connected in circuit by the jack 89 with a provision in the meter circuit so that when the plug is removed, the meter will be short circuited across the connector 93, Figure 8.

It will be noted that as the commutator 40 is rotated, the coil 77 is first connected across the meter 92 and then disconnected from the meter. It will further be noted that in the position of the switch arm 86 to the right as indicated in Figure 8, the coil 77 will be connected in circuit alternately through one or the other of the commutators 41 and 43 during the times that the arm 7 is moving through the two corresponding opposite quadrants of its circular motion so that if any disalignment occurs in this direction, the coil 77 will then be energized to produce an indication. Therefore with the position of the switch arm 86 in the direction shown in Figure 8, the alignment or disalignment in the direction of the arrows A and B and within 45° of each of them will be indicated. In one of the arrow directions A, B is in the direction of longitudinal adjustment, while the other is at right angles to it. When the switch handle 88 is moved to the left against the stop 94 from its position against the stop 95, the contacts will bear on the studs 87, 51 and 52 and the coil 77 will be connected to the measuring instrument when the commutator segments 41 and 43 are intersected by the line indicated by the arrows C and D. The tramming indication will then be given for a direction at right angles to the arrows A and B or within 45° of said direction. When the arm 86 is in its middle position then the indication will be given for both indications of the arrows A, B and C, D. In this way corrections can be made first for one direction and then for another direction and then finally adjustment can be made for both directions at a 90° angle one with the other.

As has been stated, the probe assembly 8 is supported by the bar or rod 7 extending from the bracket 6 and is adjustable by means of the clamp 58 to any position along the bar 7 which is parallel to a diameter through the axis of rotation of the hub 4 so that the probe finger 66 is moved always along a diameter through this axis.

In the operation of the device, therefore, the probe assembly is fixed in approximately its proper position in contact with the work piece, the alignment of which is to be tested. The probe may be set for outside contact with the piece as for instance the outside of a hub or a stud or toolmakers' button or it may be set for contact with the inside of a hole whichever surface it is designed to align. After the probe has been put in position, then the thumb screw 31 may be turned to make the proper desired fine adjustment while the spindle is in motion. The spindle 1 (Figure 1) is then rotated and the hub turned. The plate 5 which is provided with an adjustably positioned handle 96 attached by a support 97 to the plate through a clamping bolt 98 may be turned to rest against some part of the machine so as to insure the plate remaining stationary and approximately parallel with either the cross or longitudinal slides of the machine. The probe shown in Figures 1, 3, 4 and 5 employs a permanent magnet element. Other equivalent means may be used as illustrated by the modifications of Figures 10, 11, and 12.

In Figure 10, an electrodynamic pick-up system is employed similar to that used in loud speakers for radio and phonograph purposes. A permanent magnet system is provided in Figure 10 comprising a shell magnet 99 with an innner circular pole 100 and a central core element 101 concentric with the pole 100 providing an annular magnetic air gap. A coil 102 is supported in the air gap by a frame 103 which is attached to the end of the probe arm 104. The probe arm 104 may be exactly of the same construction as the arm 64 shown in Figure 4 and the rest of the arrangement of Figure 10 may be the same as that of Figures 4 and 5 with the supporting member 105 extending from the base of the shell 99 and pivoting the arm 104.

Figure 11:
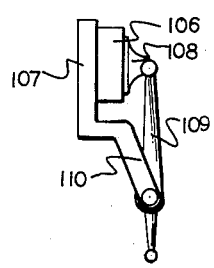

In Figure 11 there is shown the use of a piezo-electro crystal for the translating element in the probe assembly. This may comprise a crystal 106 which may be of the Rochelle salts type or any other suitable type of crystal. The crystal is supported on one side by a plate 107 and on the other side is acted upon by a compressional element 108 which may be provided with sufficient give or elasticity to allow for motion of the probe finger in contact with the work piece. Compressional, torsional and other types of crystals may be used. The supporting contact member 108 is linked or carried by the probe arm 109 which is pivoted by a forked bracket 110 similarly as described in connection with Figures 4 and 5.

In the arrangement indicated in Figure 12, a magnetic system is employed in which a pivoted magnetizable member 111 supported at a pivot 112 is moved across the face of pairs of magnetic poles. In Figure 12, the structure shown comprises a magnet 113 which has two similar pole elements 114 and 115 in diagonal positions to opposite pole elements 116 and 117. A coil 118 which is energized by the variations in magnet flux through the element 111 provides the indication for the circuit. The pivoted member 111 will first bridge across the poles 116 to 115 and then across the poles 114 to 117. The arrangement is such in this construction that the direction of the flux will be reversed, thereby generating current in the coil 118 which will produce the indication of disalignment.

In Figure 9, a general circuit is shown which may be used, in place or that of Figure 8 for instance, for any of the types of translating devices. The only difference in the arrangement of Figures 8 and 9 is that instead of employing a commutator to indicate disalignments in longitudinal and cross feed directions, two slip rings 119 and 120 are used for connecting the coil 121 with the indicator 92. The slip rings will function to show variations in positions of the probe finger but will not indicate in which direction the variations occur so that with the arrangement of Figure 9, it is not as easy to make rapid adjustment and centering as with the circuit arrangement of Figure 8.

It has been mentioned that the coil 77 is rotated with the commutator. The connection for this arrangement is shown in Figure 7 where the conductor 122 is connected from the coil to the commutator by means of a spring clip 123.

When the tramming tool is placed in a borer, drill, or other type of machine, it is turned rapidly so that the indicator will be constantly in motion with larger and then smaller amplitudes until a complete adjustment is attained. One of the great advantages of the present device is found in making adjustments of the work in position while the tramming tool is rotated because the indication is positive and the work must be accurately set to bring the indicator completely to rest.

Having now described my invention, I claim:

1. In an electrical tramming indicator, a stationary member, a rotatable member supported for rotation by the stationary member, a tramming unit supported by the rotating member including a tramming arm and point and an electrical translating device having a moving element supported by the tramming arm, a commutator coaxially mounted with respect to said rotatable members and rotated therewith, said commutator having four segments with a pair of diametrically opposite segments connected to said electrical translating device, a plurality of brushes connected to contact said commutator in different angular positions, switching means for selectively making connections to said brushes and indicating means connected to said switching means whereby the operation of said electrical translating device in different positions of the commutator contact with said brushes may be observed.

2. In an electrical tramming indicator, a stationary member, a rotatable member supported for rotation by the stationary member, a tramming unit supported by the rotating member including a tramming arm and point and an electrical translating device having a moving element supported by the tramming arm, a commutator coaxially mounted with respect to said rotatable members and rotated therewith, said commutator having two diametrically opposite substantially 90° sectors connected together and to said electrical translating device, a plurality of brushes positioned to contact said commutator in different angular positions with reference to said rotating members, switching means for selectively making connections to said brushes and indicating means connected to said switching means whereby the operation of said electrical translating device in different positions of the commutator contact with said brushes may be observed.

3. In an electrical tramming indicator, a stationary member, a rotatable member supported by said stationary member, a tramming unit carried by said rotatable member comprising an electrical translating device consisting of a conductive coil with a core and pole pieces extending therefrom mounted in a fixed position on the rotatable member and a permanent magnet positioned to bridge the pole pieces, a pivoted arm carrying said permanent magnet and having a tramming point, and means partly on the stationary member for energizing the translating device when the tramming point passes through a given position of its rotation.

4. An electrical tramming indicator comprising a stationary member, a rotatable member supported for rotation by the stationary member, a commutator mounted coaxially with the rotatable member having segments covering sectors having portions at 90° from each other, brush elements adapted to bear on the commutator segments at an angle of 90° to each other about the rotation axis, a tramming unit supported by said rotating member and having a tramming pointer, means for positioning the tramming point along a diameter which is a bisector of said last named angle of 90°, a translating device carried by said tramming unit and connected to a pair of opposite commutator segments and conducting means for connecting said brushes to an indicator.

5. An electrical tramming indicator comprising a stationary member, a rotatable member supported for rotation by the stationary member, a commutator mounted coaxially with the rotatable member having segments covering sectors of 90°, brush elements bearing on said commutators at the middle of two adjacent sectors, a switching means for selectively connecting to either or both of said brushes, a tramming unit carried by said rotatable member having a tramming point and a translating device operated thereby when the tramming point comes in contact with the work as the tramming point is rotated, means connecting said translating device to two opposite sectors, and means for connecting the switching means to an indicator whereby indications may be obtained of the centering of the work in the direction of two 90° axes perpendicular to the axis of rotation.

6. In an electrical tramming indicator, a stationary member, a rotatable member supported for rotation by the stationary member, a tramming unit supported by the rotating member including a tramming arm and point and an electrical translating device having a moving element supported by the tramming arm, means grounding one side of said translating device, a commutator having a segment of not more than 90° carried by said rotatable member to which the other side of said translating device is connected, a plurality of brushes positioned about the commutator to contact it at various angular positions, switching means for selecting one or more of said brushes and means for connecting said brushes to an indicator.

7. In an electrical tramming indicator, a stationary member, a rotatable member supported for rotation by the stationary member, adjustable arm means carried by the stationary member adapted to be turned to a desired position to secure said stationary member in a fixed position, a tramming unit supported by the rotating member including a tramming arm and point and an electrical translating device comprising a fixed element and a moving element supported by the tramming arm and means for producing an indication adapted to be connected with said translating device.

8. In an electrical tramming indicator a stationary member, a rotatable member mounted on said stationary member for rotation, a tramming unit carried by said rotatable member having an electrical translating device and a tramming arm and point operative to energize the translating device by motion against the work to be centered, means for moving the tramming unit small amounts on a diameter through the axis of the rotatable member while the member is being rotated comprising a shaft mounted within the rotatable member having a tongue projecting from the end thereof at the center of the axis of rotation at an angle with said axis, a plate on which said tramming unit is mounted, means mounting the plate on the rotatable member providing freedom of motion along one diameter of the axis of the rotatable member, said tongue engaging and fitting through a hole in said plate and means on said stationary member for moving said shaft longitudinally along the axis of said rotatable member whereby said plate is moved along said diameter.

References Cited in the file of this patent

UNITED STATES PATENTS

| | | |
|---|---|---|
| 1,241,469 | Payne | Sept. 25, 1917 |
| 1,416,694 | De Leeuw | May 23, 1922 |
| 1,953,614 | King | Apr. 3, 1934 |
| 1,994,497 | Winters | Mar. 19, 1935 |
| 2,090,803 | Moore | Aug. 24, 1937 |
| 2,179,573 | Criddle | Nov. 14, 1939 |
| 2,316,524 | Martin | Apr. 13, 1943 |
| 2,452,862 | Neff | Nov. 2, 1948 |
| 2,466,380 | Clark | Apr. 5, 1949 |
| 2,490,483 | Simer | Dec. 6, 1949 |
| 2,497,680 | Massa | Feb. 14, 1950 |
| 2,499,665 | Mestas | Mar. 7, 1950 |
| 2,509,986 | Neff | May 30, 1950 |
| 2,545,881 | Graham | Mar. 20, 1951 |
| 2,554,271 | Slepian | May 22, 1951 |
| 2,583,253 | Carder | Jan. 22, 1952 |

FOREIGN PATENTS

| | | |
|---|---|---|
| 150,259 | Austria | July 26, 1937 |
| 194,216 | Switzerland | Feb. 16, 1938 |